No. 737,745. Patented September 1, 1903.

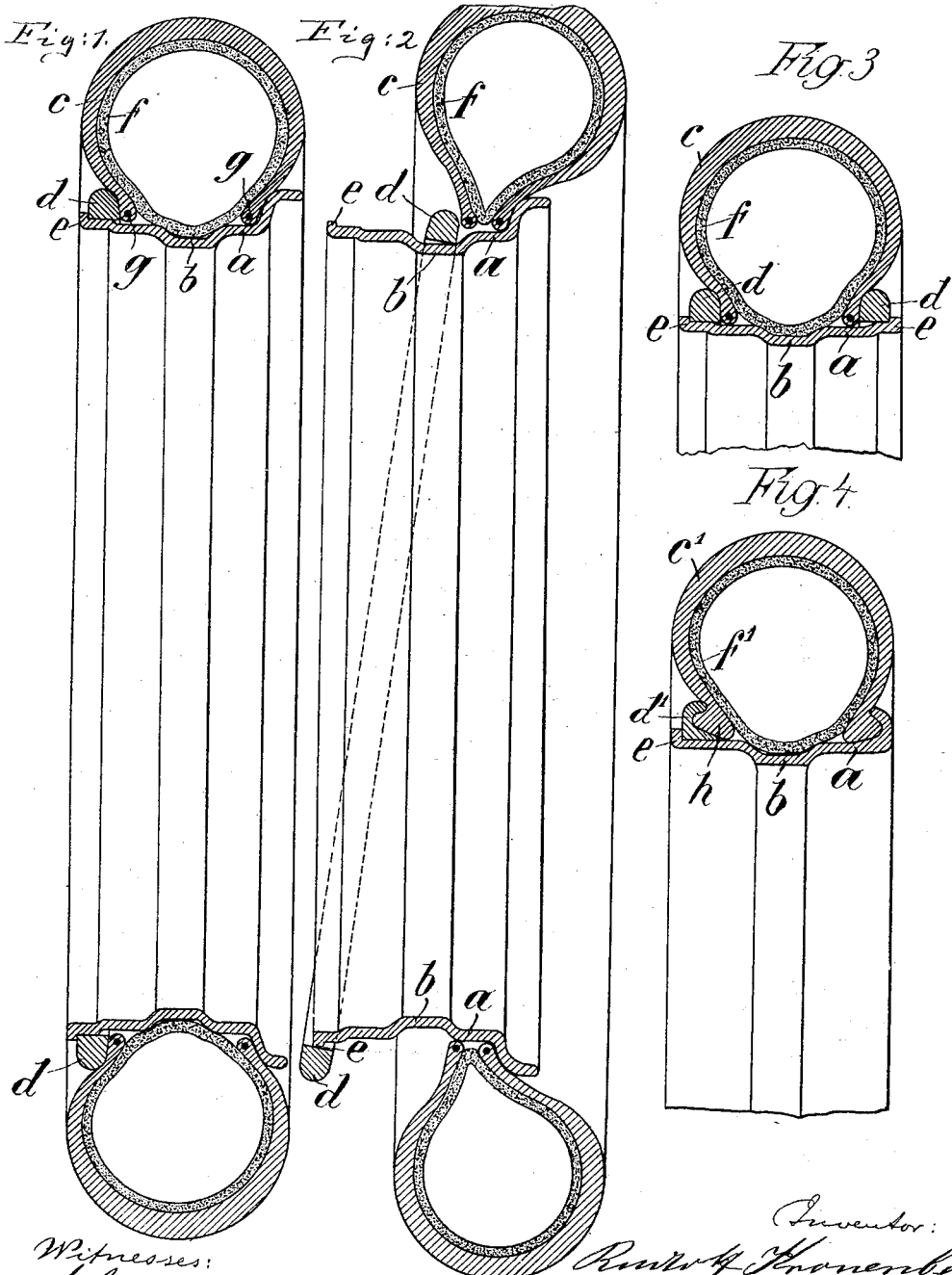

UNITED STATES PATENT OFFICE.

RUDOLF KRONENBERG, OF OHLIGS, GERMANY.

FELLY FOR VEHICLE-WHEELS.

SPECIFICATION forming part of Letters Patent No. 737,745, dated September 1, 1903.

Application filed February 17, 1903. Serial No. 143,800. (No model.)

*To all whom it may concern:*

Be it known that I, RUDOLF KRONENBERG, a subject of the King of Prussia, German Emperor, residing at Ohligs, Germany, have invented a certain new and useful Improvement in Fellies for Horseless Carriages, Cycles, and other Vehicles, of which the following is a specification.

In horseless carriages with pneumatic wheel-tires there has been the grave inconvenience that the cover for the air-tube can only be attached to the tire and detached therefrom with difficulty. In view of the considerable weight of the vehicle and of the very heavy load which is thus acting upon the wheels the covers are very strongly built, and they thereby acquire great stiffness, so that the attaching and detaching of the covers can only be effected by especially trained, skilled, and strong persons, and even with these the work takes considerable time. Various constructions of fellies have been devised in order to facilitate the attaching of the tire, these previous constructions showing substantially the common feature that the lateral rim against which the edge of the pneumatic tire is to rest or with which it is to engage by means of a thickened part is made detachable, so as to be able to attach and detach the pneumatic cover from the side after the rim has been removed. After mounting the cover the lateral rim is in the former constructions connected to the felly by screws or the like. In such devices the unscrewing operation takes considerable time, and, furthermore, this construction is not safe and reliable enough. Thus, for instance, if a screw is broken or has become loose the cover becomes disconnected from the felly, and accidents in driving which are due to the loosening of the cover are of frequent occurrence.

My invention refers to a construction of felly for horseless carriages and other vehicles which while making use of a detachable laterally-thickened part or rim enables me, however, to avoid screw connections or similar means of attachment. It is merely the peculiar nature of the construction which serves to retain the detachable rim or the thickened part in position, the attaching and detaching of the cover with the air-tube being effected in a most simple manner and without any special skill or training in a very short time after the necessary manipulations have been shown to the operator.

In the accompanying drawings, Figure 1 is a cross-section through a wheel-rim embodying my invention. Fig. 2 is a similar section, showing the tire in position to be taken off. Fig. 3 is a section through a modification of the rim, and Fig. 4 a section through a further modification.

As appears from Fig. 1 the felly or wheel-rim $a$ is provided with a central depression $b$, the thickened part, which is commonly used in such fellies for engaging with the pneumatic cover $c$, being formed by a slidable ring $d$, which is removably retained on the felly by resting against the outwardly or upwardly projecting outer flange or rim $e$ of the same and is otherwise loosely placed on the felly. The inner diameter of the ring $d$ corresponds to the outer diameter of the felly, so that the projecting rim $e$ produces a reliable attachment of the ring to the felly and prevents lateral slipping off. The lower edge of the inflated pneumatic cover $c$, reinforced by an embedded wire $g$, is adapted to bear tightly against the inner side of the ring. The ring and cover are disconnected from each other, so as to be independently movable. The ring is continuous and not cut open, as usual. Thus the screws or other fastening devices of this kind are avoided in this construction. When it is, for instance, desired to detach the cover $c$, with the air-tube $f$, from the felly $a$, the cover $c$, after allowing the air to escape from the air-tube, is pressed together, as shown in Fig. 2 of the drawings—that is to say, it is forced against one side of the felly. Then the ring $d$ is, for instance, placed upon the upper side until it gets into the central depression $b$, while at the same time the ring is pulled outwardly on the lower side of the felly. The depression $b$ in the center of the felly is of such dimension that, as appears from Fig. 2, the lower part of the ring can be pulled out over the rim $e$ when the ring has been placed in this depression on the upper side of the wheel, thus allowing the ring to be entirely detached from the felly. After this is done the cover, with the air-tube, may be pulled off laterally over the projecting rim $e$. For mounting the cover upon the felly the order of operations is reversed. First the inner edge of the cover is drawn over the edge e, then the air-tube is introduced, and finally the opposite edge of the cover is placed in position, as shown in Fig. 2. Then the ring d is mounted and is pushed forward by hand until it engages with the rim e. Upon inflating the air-tube the lower edge of the cover c, which is strengthened by embedded wires g, is forced tightly against the ring, which in turn is pressed against the rim e. From Fig. 3 it will appear that a detachable ring d may also be arranged on both sides of the felly.

Fig. 4 shows a modified construction which makes use of a so-called "foot" or thickened edge—pneumatic. In this construction the edge of the cover c' is hook-shaped, and the ring d' is accordingly also somewhat in form of a hook, with which the thickened edge h of the cover c' will engage. This construction differs from those represented by Figs. 1 to 3 merely by a different section of the ring d.

What I claim, and desire to secure by Letters Patent of the United States, is—

A wheel-rim having a depression and an outer flange, a pneumatic tire surrounding the rim, a wire embedded in the lower edge of the tire, and a ring removably mounted on the rim between the wired edge of the tire and the rim-flange, substantially as specified.

In witness whereof I have hereunto signed my name in the presence of two subscribing witnesses.

RUDOLF KRONENBERG.

Witnesses:
ARTHUR CLOSTERMANN,
VICTOR W. HELDT.